US008700375B2

(12) United States Patent
Shirakawa et al.

(10) Patent No.: US 8,700,375 B2
(45) Date of Patent: Apr. 15, 2014

(54) ELECTROMAGNETIC COUPLER, WIRELESS TERMINAL INCLUDING SAME, AND METHOD FOR DESIGNING ELECTROMAGNETIC COUPLERS

(75) Inventors: Yohei Shirakawa, Hitachi (JP); Keisuke Fukuchi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 211 days.

(21) Appl. No.: 13/071,558

(22) Filed: Mar. 25, 2011

(65) Prior Publication Data

US 2011/0238398 A1 Sep. 29, 2011

(30) Foreign Application Priority Data

Mar. 26, 2010 (JP) ................................ 2010-071300

(51) Int. Cl.
*G06F 17/50* (2006.01)
*G06G 7/62* (2006.01)

(52) U.S. Cl.
USPC .......................................................... 703/13

(58) Field of Classification Search
None
See application file for complete search history.

(56) References Cited

U.S. PATENT DOCUMENTS 4,476,447 A * 10/1984 Lauchner ..................... 333/111
5,051,545 A * 9/1991 McDermott ............... 178/18.07
2006/0267845 A1* 11/2006 Takei et al. ........... 343/700 MS
2007/0240898 A1* 10/2007 Reichert et al. ........... 174/117 F

FOREIGN PATENT DOCUMENTS

JP 2007221344 A * 8/2007
JP 2008-099236 4/2008
JP 4345851 7/2009

OTHER PUBLICATIONS

Misao Haneishi et al., Small and Planar Antennas, The Institute of Electronics, Information and Communication Engineers, PP.

* cited by examiner

*Primary Examiner* — Omar F Fernandez Rivas
*Assistant Examiner* — Bernard E Cothran
(74) *Attorney, Agent, or Firm* — Antonelli, Terry, Stout & Kraus, LLP.

(57) ABSTRACT

There is provided an electromagnetic coupler that communicates signals by using at least one of a longitudinal electrostatic field and a longitudinal induced electric field. The electromagnetic coupler has a ground conductor, a radiation conductor composed of a plurality of rectangular conductors connected in series, and a feeding point formed at one point in the connection of the plurality of rectangular conductors. The plurality of rectangular conductors are connected such that each pair of adjacent rectangular conductors form an angle other than π radian, and a length from the feeding point to either end of the radiation conductor is an integral multiple of λ/4 in electrical length with respect to a wavelength λ of a central frequency of a frequency band of interest of the electromagnetic coupler.

12 Claims, 10 Drawing Sheets

ELECTROMAGNETIC COUPLER, WIRELESS TERMINAL INCLUDING SAME, AND METHOD FOR DESIGNING ELECTROMAGNETIC COUPLERS

CLAIM OF PRIORITY

The present application claims priority from Japanese patent application serial no. 2010-071300 filed on Mar. 26, 2010, the content of which is hereby incorporated by reference into this application.

BACKGROUND OF THE INVENTION

1. Field of the Invention

The present invention relates to an electromagnetic coupler suitable for use in wireless communications systems to communicate information between wireless terminals disposed in close proximity to each other by using a longitudinal electrostatic field or a longitudinal induced electric field. The invention also relates to a wireless terminal including said electromagnetic coupler, and a method for designing electromagnetic couplers.

2. Description of Related Art

Conventional electromagnetic couplers include one disclosed in JP-B 4345851. This electromagnetic coupler (high-frequency coupler) can communicate over a short distance by using a longitudinal electrostatic field or a longitudinal induced electric field. Also, a large volume of data can be exchanged between wireless terminals equipped with this electromagnetic coupler in UWB (Ultra Wide Band) communications systems, in which wide band signals are used.

Also, in the above wireless communications system, each of the electromagnetic couplers included in the wireless terminal on a transmission side (transmitter) and the wireless terminal on a reception side (receiver) is formed by connecting a plate-like electrode to a series inductor and a parallel inductor via a feeder (high-frequency transmission line). When the electromagnetic couplers are disposed such that they face each other, the constant of a capacitor formed by the two electrodes, the series inductors, and the parallel inductors are set up such that impedance matching can be obtained in the frequency band of interest in wireless communications. As a result, the electromagnetic couplers facing each other behave like a band pass filter as a whole in the frequency band of interest, making it possible to efficiently transmit high-frequency signals between the two electromagnetic couplers.

As described above, a conventional electromagnetic coupler (e.g., described in JP-B 4345851) includes a plate-like electrode and series and parallel inductors. The design parameters of a conventional electromagnetic coupler are the size of its electrode and the values of its series and parallel inductors. Chip parts can be used as the series and parallel inductors. Unfortunately, however, common chip parts can be lossy and relatively costly depending on the frequency band of interest, while low-loss chip parts are even costlier.

A conventional electromagnetic coupler can also be formed of a general-purpose printed-circuit board instead of chip parts. In this case, its series and parallel inductors are formed of transmission lines such as microstrips. Forming an electromagnetic coupler with a printed-circuit board can control loss increase and reduce the cost compared to the case with chip parts. In this case, however, the design parameters are the width, length, and configuration of the transmission lines forming the series and parallel inductors in addition to the size of its electrode.

In the case of conventional electromagnetic couplers facing each other, a capacitor with an appropriate capacitance value is obtained between the electrodes disposed at a certain distance from each other, and communication is made possible at a certain frequency. When a capacitor with an appropriate capacitance value is not obtained, communication is made difficult. However, when wireless terminals each including an electromagnetic coupler are disposed such that they face each other, a capacitor with an appropriate capacitance value may not be obtained depending on the distance between the electrodes of the electromagnetic couplers. For example, even when wireless terminals are disposed such that the distance between the electrodes of their electromagnetic couplers becomes the shortest, it is difficult to obtain a desired capacitance value if the distance between the electrodes of the electromagnetic couplers is relatively long due to the structure of the wireless terminals or other factors. In such a case, since a capacitor with an appropriate capacitance value is not obtained, communication is made difficult. Although it is possible to adjust a capacitance value by changing the area of an electrode, it is difficult to change the area of an electrode due to constraints on the structure of an electrode, such as a constraint that the electrodes facing each other must have the same area.

Moreover, in communication by using electromagnetic couplers, communication directions need to be increased in some cases. Communication directions can be increased by increasing the area of an electrode to produce the electric field in a wider range. In conventional electromagnetic couplers, however, it is difficult to increase communication directions, because an appropriate capacitance value between electrodes needs to be obtained and there are constraints on the structure of an electrode.

SUMMARY OF THE INVENTION

In view of the foregoing, it is an objective of the present invention to provide an electromagnetic coupler which can communicate by using an electrostatic field and/or a longitudinal induced electric field without any constraints on the structure of an electrode.

(I) According to one aspect of the present invention, there is provided an electromagnetic coupler that communicates signals by using at least one of a longitudinal electrostatic field and a longitudinal induced electric field. The electromagnetic coupler has a ground conductor, a radiation conductor composed of a plurality of rectangular conductors connected in series, and a feeding point formed at one point in the connection of the plurality of rectangular conductors. The plurality of rectangular conductors are connected such that each pair of adjacent rectangular conductors form an angle other than n radian (rad), and a length from the feeding point to either end of the radiation conductor is an integral multiple of $\lambda/4$ in electrical length with respect to a wavelength $\lambda$ of a central frequency of a frequency band of interest of the electromagnetic coupler.

In the above aspect (I) of the invention, the following modifications and changes can be made.

i) The radiation conductor is disposed such that the plurality of rectangular conductors are symmetric with respect to a line which forms an angle other than $\pi/2$ rad with lines parallel to the long sides of the plurality of rectangular conductors.

ii) The plurality of rectangular conductors and the ground conductor are formed on the same plane.

iii) Each of the plurality of rectangular conductors has a long side of an integral multiple of $\lambda/4$ in electrical length.

iv) Each of the plurality of rectangular conductors has a short side smaller than 0.15 times the wavelength λ in electrical length.

v) The plurality of rectangular conductors and the ground conductor are formed on a dielectric substrate.

vi) Each of the plurality of rectangular conductors and the ground conductor is formed of a metal plate.

vii) One end of the radiation conductor is open, and a length from the feeding point to the open end of the radiation conductor is an odd multiple of λ/4 in electrical length.

viii) One end of the radiation conductor is short-circuited, a length from the feeding point to the short-circuited end of the radiation conductor is an even multiple of λ/4 in electrical length.

(II) According to another aspect of the present invention, there is provided a wireless terminal including an electromagnetic coupler that communicates signals by using at least one of a longitudinal electrostatic field and a longitudinal induced electric field, and a communication transmitter and receiver module for modulating and demodulating signals. The electromagnetic coupler has a ground conductor, a radiation conductor composed of a plurality of rectangular conductors connected in series, and a feeding point formed at one point in the connection of the plurality of rectangular conductors. The plurality of rectangular conductors are connected such that each pair of adjacent rectangular conductors form an angle other than n rad, and a length from the feeding point to either end of the radiation conductor is an integral multiple of λ/4 in electrical length with respect to a wavelength λ of a central frequency of a frequency band of interest of the electromagnetic coupler. A signal line of the transmitter and receiver module is connected to the feeding point of the radiation conductor.

In the above aspect (II) of the invention, the following modifications and changes can be made.

ix) The transmitter and receiver module is disposed on the ground conductor of the electromagnetic coupler.

(III) According to still another aspect of the present invention, there is provided a method for designing an electromagnetic coupler that communicates signals by using at least one of a longitudinal electrostatic field and a longitudinal induced electric field. The method includes the steps of: selecting an initial configuration composed of a ground conductor, a radiation conductor composed of a plurality of rectangular conductors connected in series, and a feeding point formed at one point in the connection of the plurality of rectangular conductors; assessing whether the selected configuration satisfies a desired value of coupling strength in a center of a coupling range or not; and assessing whether the configuration judged to satisfy the desired value of coupling strength in the center of the coupling range satisfies the desired value of coupling strength throughout the coupling range.

In the above aspect (III) of the invention, the following modifications and changes can be made.

x) The method further includes the step of: adjusting at least one of distances between the rectangular conductors and the ground conductor and an electrical length of a long side of the rectangular conductors when the selected configuration is judged not to satisfy the desired value of coupling strength in the center of the coupling range.

xi) The method further includes the step of: selecting an electrical length from the feeding point formed at one point in the connection of the plurality of rectangular conductors to either end of the radiation conductor from among integral multiples of ¼ of a wavelength λ of a central frequency of a frequency band of interest of the electromagnetic coupler when the selected configuration judged to satisfy the desired value of coupling strength in the center of the coupling range is judged not to satisfy the desired value of coupling strength throughout the coupling range.

xii) The method selects an initial configuration including an open-ended radiation conductor composed of two rectangular conductors that are ¼ of a wavelength λ of a central frequency of a frequency band of interest in electrical length.

Advantages of the Invention

According to the present invention, it is possible to provide an electromagnetic coupler that can communicate by using an electrostatic field and/or an induced electric field without any constraints on the structure of an electrode.

DETAILED DESCRIPTION OF THE PREFERRED EMBODIMENTS

[Basic Concept of the Invention]

Figure 1:
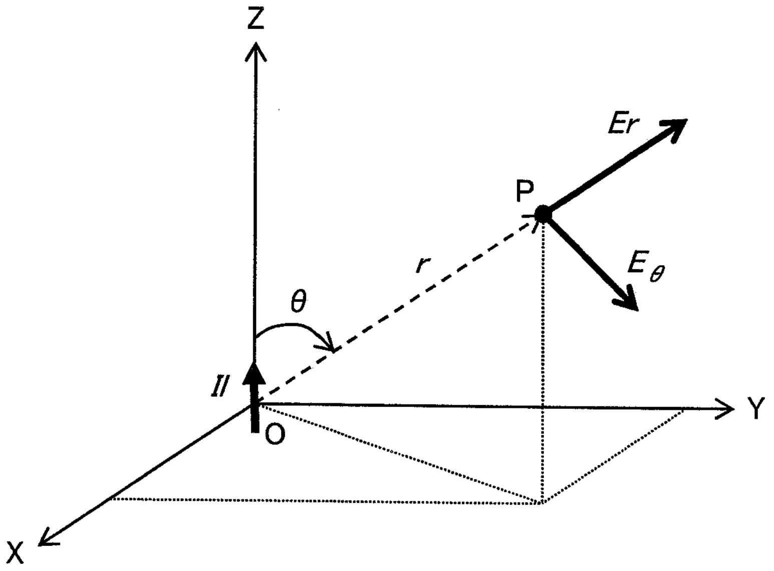
FIG. 1 is a diagram for explaining a longitudinal wave and a traverse wave in an electric field.

As described above, according to the present invention, an electromagnetic coupler that communicates signals by using at least one of a longitudinal electrostatic field and a longitudinal induced electric field has a ground conductor, a radiation conductor composed of a plurality of rectangular conductors connected in series, and a feeding point formed at one point in the connection of the plurality of rectangular conductors. The plurality of rectangular conductors are connected such that the long sides (and their extensions) of each pair of adjacent rectangular conductors form an angle other than π rad. Also, the length from the feeding point to either end of the radiation conductor is an integral multiple of λ/4 in electrical length with respect to the wavelength λ of the central frequency of the frequency band of interest of the electromagnetic coupler.

It is desirable that the electrical length corresponding to the length of the short sides of the rectangular conductors is smaller than 0.15 times the wavelength λ of the central frequency of the frequency band of interest, and that the electrical length corresponding to the length of the long sides of the rectangular conductors is an integral multiple of approximately ¼ of the wavelength λ of the central frequency of the frequency band of interest. Herein, the real part of the input admittance seen from a point on the ground conductor that is the closest to a center point of a short side of one of the rectangular conductors in the direction to the rectangular conductors has a maximum value at the central frequency of the frequency band of interest.

The coupling strength of the electromagnetic coupler of the present invention can be adjusted by adjusting the distance between the rectangular conductors and the ground conductor. There is a negative correlation between this distance and the maximum value of the real part of the input admittance in the frequency band of interest. Also, the imaginary part is zero at the frequency at which the real part has a maximum value. Therefore, matching adjustments between the electromagnetic coupler and a feed system whose input admittance has a zero imaginary part can be easily made by adjusting this distance.

In this specification, coupling strength represents, in the case of two electromagnetic couplers facing each other at a distance at which an electrostatic field or an induced electric field becomes dominant in wireless communications between the two electromagnetic couplers, a ratio of the output power to the input power when a signal of a certain frequency is inputted from one of the two electromagnetic couplers to the other. Herein, the distance at which an electrostatic field or an induced electric field becomes dominant in wireless communications between the two electromagnetic couplers represents a distance that is smaller than 1/10 of the wavelength λ of the central frequency of the frequency band of interest. Also, a coupling range represents a range of the relative position between two electromagnetic couplers when a certain coupling strength (a desired value of coupling strength) is obtained.

FIG. 1 is a diagram for explaining a longitudinal wave and a traverse wave in an electric field. As shown in FIG. 1, there is a longitudinal wave ($E_r$) and a traverse wave ($E_\theta$) in an electric field generated by an infinitesimal dipole (current I and length l), and $E_r$ and $E_\theta$ are expressed by the following Equations (1) and (2), respectively (see, e.g., non-patent literature 1). Non-patent literature 1: "SMALL AND PLANAR ANTENNAS" by Misao Haneishi et al., published by The Institute of Electronics, Information and Communication Engineers, pp. 22-23.

$$E_r = \frac{Il}{2\pi}\exp(-jk_0 r)\left\{\frac{\eta_0}{r^2} + \frac{1}{jw\varepsilon_0 r^3}\right\}\cos\theta \qquad \text{Eq. (1)}$$

-continued $$E_\theta = \frac{Il}{4\pi}\exp(-jk_0 r)\left\{\frac{jw\mu_0}{r} + \frac{\eta_0}{r^2} + \frac{1}{jw\varepsilon_0 r^3}\right\}\sin\theta \qquad \text{Eq. (2)}$$

Herein, I1 represents an infinitesimal dipole passing through the origin 0 and existing along the Z-axis; $\eta_0$ represents the characteristic impedance; $E_r$ represents the longitudinal wave at the observation point P; $E_0$ represents the traverse wave at the observation point P; r represents the distance from the infinitesimal dipole I1 to the observation point P; $k_0$ represents the wave number; j represents an imaginary unit; w represents the angular frequency; $\epsilon_0$ represents the dielectric constant of a vacuum; $\mu_0$ represents the permeability constant of a vacuum; and θ represents the angle between the Z-axis (infinitesimal dipole) and the observation point P.

Figure 2:
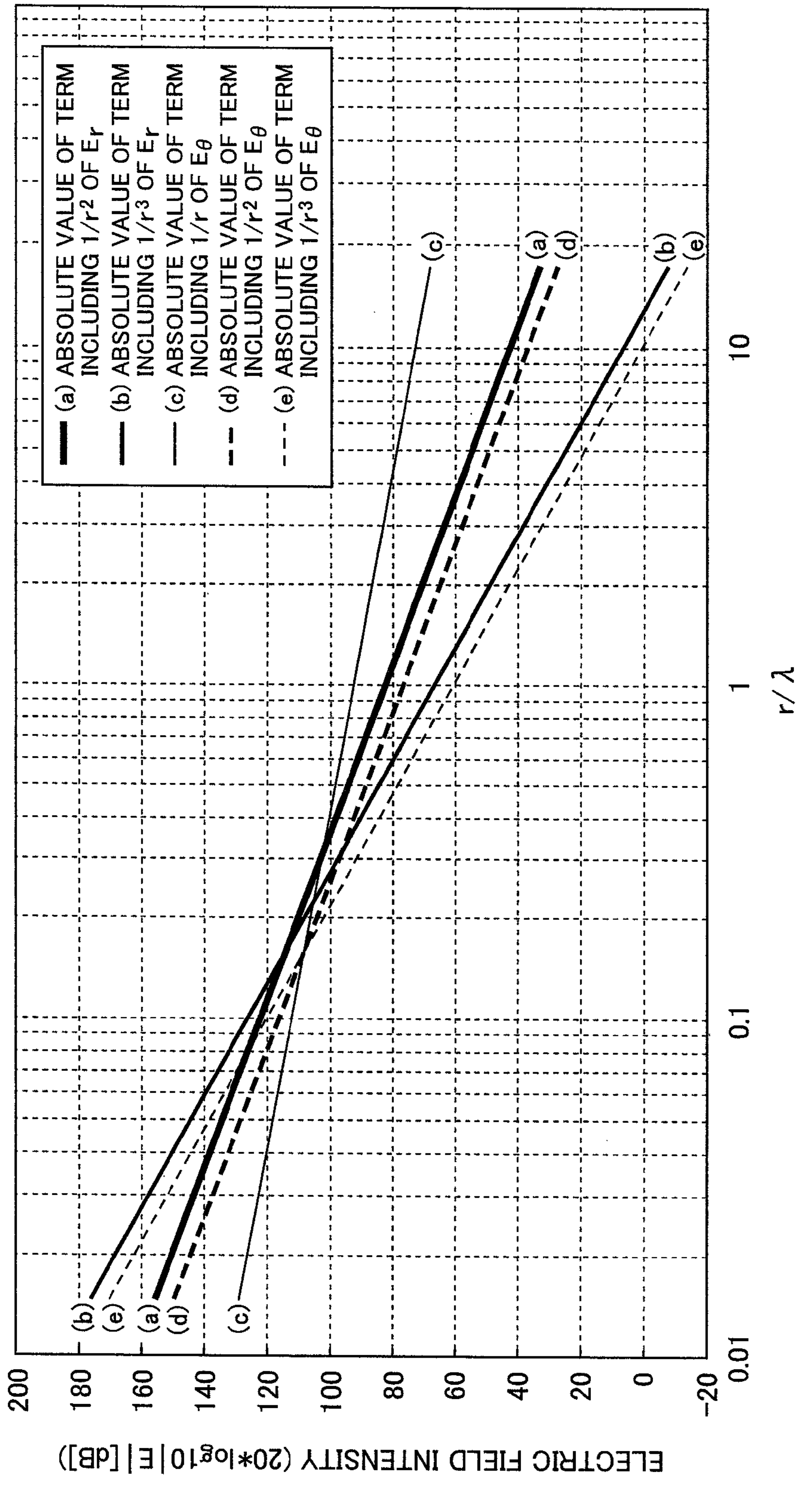
FIG. 2 is a graph showing a relationship between a distance-wavelength ratio (r/λ) in the electric field and an electric field intensity calculated based on Eqs. (1) and (2).

FIG. 2 is a graph showing a relationship between a distance-wavelength ratio (r/λ) in the electric field and an electric field intensity calculated based on Eqs. (1) and (2). In FIG. 2, the horizontal axis of the graph shows the distance-wavelength ratio (r/λ) in the electric field, and the vertical axis of the graph shows the electric field intensity. In FIG. 2 are shown the following five electric field component amplitudes:

(a) The absolute value of the term including $1/r^2$ of the longitudinal wave $E_r$;

(b) The absolute value of the term including $1/r^3$ of the longitudinal wave $E_r$;

(c) The absolute value of the term including 1/r of the traverse wave $E_\theta$;

(d) The absolute value of the term including $1/r^2$ of the traverse wave $E_\theta$; and (e) The absolute value of the term including $1/r^3$ of the traverse wave $E_\theta$.

As shown in FIG. 2, the logarithm of an electric field intensity E and r/λ are in negative proportion to each other, and the slope of each line varies depending on the proportionality factor. Therefore, in the case of electromagnetic couplers coupled to each other, the electric field component to be used to obtain maximum coupling strength depends on r/λ between the two couplers. In particular, in the area where r/λ used as electromagnetic coupling is smaller than 0.1, (b) and (e) are dominant. As described hereinafter, according to the present invention, it is possible to select an appropriate electric field component by selecting an angle formed by the long sides of rectangular conductors.

Figure 3:
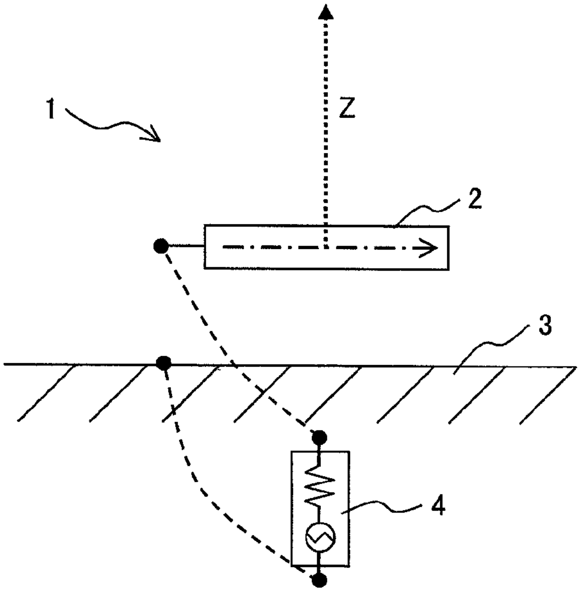
FIG. 3 is a schematic illustration for explaining an electric component radiated by an electromagnetic coupler including a rectangular conductor.
Figure 4:
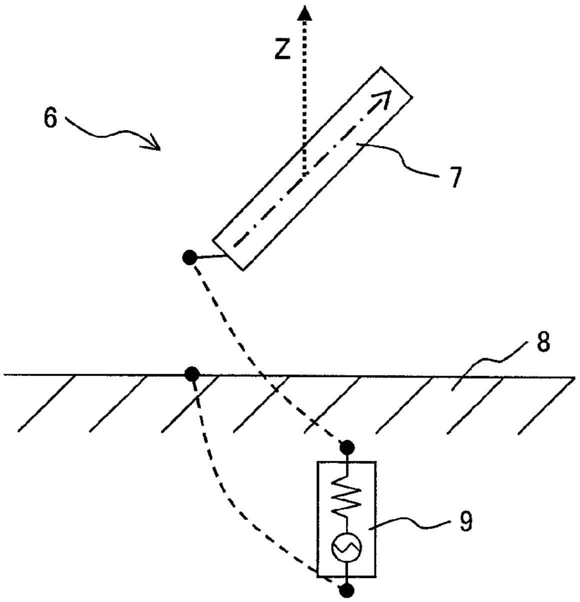
FIG. 4 is another schematic illustration for explaining an electric component radiated by an electromagnetic coupler including a rectangular conductor.

FIG. 3 is a schematic illustration for explaining an electric component radiated by an electromagnetic coupler including a rectangular conductor. FIG. 4 is another schematic illustration for explaining an electric component radiated by an electromagnetic coupler including a rectangular conductor. For example, the electromagnetic coupler 1 shown in FIG. 3 is composed of: a rectangular conductor 2 generating a current equivalent to that generated by an infinitesimal dipole on a plane; a ground conductor 3; and a power supply 4 connected between the rectangular conductor 2 and the ground conductor 3. When the angle formed by a line parallel to the long sides of the rectangular conductor 2 and a Z-axis parallel to an imaginary line (the direction of coupling) connecting the rectangular conductor 2 and another electromagnetic coupler to be coupled with the electromagnetic coupler 1 is π/2 rad, only the electric field components (c), (d), and (e) (i.e., transverse waves) are radiated with no electric field component parallel to the Z-axis being generated.

In contrast, the electromagnetic coupler 6 shown in FIG. 4 is composed of: a rectangular conductor 7 generating a current equivalent to that generated by an infinitesimal dipole on a plane; a ground conductor 8; and a power supply 9 connected between the rectangular conductor 7 and the ground conductor 8. When the angle formed by a line parallel to the long sides of the rectangular conductor 7 and a Z-axis parallel to an imaginary line (the direction of coupling) connecting the rectangular conductor 7 and another electromagnetic coupler to be coupled with the electromagnetic coupler 6 is $\pi/4$ rad, all of the electric field components (a) to (e) (i.e., transverse waves and longitudinal waves) are radiated with electric field components parallel to the Z-axis being generated.

The sum of the electric field component intensities when $r/\lambda$ from the rectangular conductor is 0.03 is larger for the electromagnetic coupler 6 in FIG. 4 at 157.1 dB than for the electromagnetic coupler 1 in FIG. 3 at 153.5 dB. As just described, since the intensities of radiated electric field components vary depending on the angle of the rectangular conductor with respect to the coupling direction, coupling strength can be adjusted by selecting the angle properly.

Furthermore, as shown by Eqs. (1) and (2), unlike a transverse electric field component, a longitudinal electric field component does not have any terms proportional to $1/r$, and therefore the amount of attenuation with respect to distance is large. Accordingly, the attenuation of the electric field intensity with respect to distance is larger for the electromagnetic coupler 6 shown in FIG. 4 than for the electromagnetic coupler 1 shown in FIG. 3, which does not radiate any longitudinal waves in the Z-direction. As a result, the coupling strength attenuates more rapidly with respect to distance in the case of two electromagnetic couplers 6 shown in FIG. 4 facing each other than in the case of two electromagnetic couplers 1 shown in FIG. 3 facing each other. Therefore, the rectangular conductor 7 tilted with respect to the coupling direction as shown in FIG. 4 is suitable for use in an electromagnetic coupler that communicates information wirelessly only at close range. In addition, coupling strength with respect to distance can be adjusted by properly selecting the angle of the rectangular conductor with respect to the coupling direction.

Moreover, because the electromagnetic coupler of the present invention is composed of rectangular conductors and a ground conductor and requires no electrode, its configuration is simple. The electromagnetic coupler of the present invention can be formed of a general-purpose printed-circuit board and conductor plates, thereby enabling to reduce a cost.

Next, a method for designing electromagnetic couplers in accordance with the present invention will be described hereinafter. The objective of this design method is to obtain an electromagnetic coupler with a desired coupling strength and a desired coupling range. One method for increasing coupling strength is to improve matching conditions between an electromagnetic coupler and its feed system, and one method for increasing a coupling range is to change the shape of an electromagnetic coupler such that the range of an electric field generated from the electromagnetic coupler expands.

Figure 5:
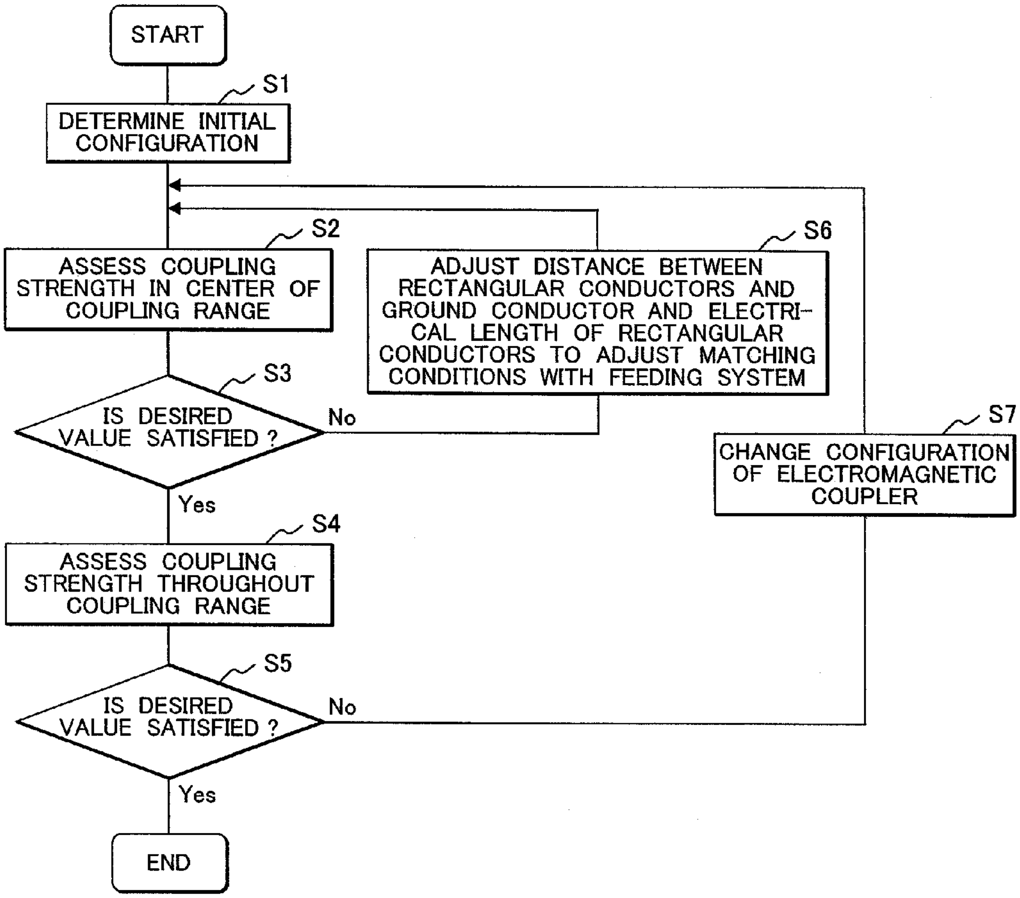
FIG. 5 is a design flowchart illustrating an example of a method for designing electromagnetic couplers in accordance with the present invention.

The method for designing electromagnetic couplers in accordance with the present invention will be described hereinafter with reference to a flowchart shown in FIG. 5. FIG. 5 is a design flowchart illustrating an example of a method for designing electromagnetic couplers in accordance with the present invention.

The design object here is an electromagnetic coupler. As shown in FIG. 5, at first, an initial configuration of the electromagnetic coupler is determined (S1). As an initial configuration, it is possible to select a configuration composed of a ground conductor, a radiation conductor composed of a plurality of rectangular conductors connected in series, and a feeding point formed at one point in the connection of the plurality of rectangular conductors. In order to obtain a smaller electromagnetic coupler, for example, it is possible to select an initial configuration including an open-ended radiation conductor composed of two rectangular conductors that are approximately ¼ of the wavelength $\lambda$ of the central frequency of the frequency band of interest in electrical length.

Next, coupling strength in the center of a coupling range is assessed regarding the initial configuration (S2). Then, it is judged whether the coupling strength satisfies a desired value in the center of the coupling range or not (S3). When the desired value is satisfied, the coupling strength throughout the coupling range is assessed (S4). Then, it is judged whether the coupling strength satisfies the desired value throughout the coupling range or not (S5). When the desired value is satisfied, the design process is finished.

On the other hand, when the coupling strength does not satisfy the desired value in the center of the coupling range, matching conditions with a feed system are adjusted by adjusting the distance between the rectangular conductors (the radiation conductor) and the ground conductor and the electrical length of the rectangular conductors (the radiation conductor) (S6). The value of the real part of the input admittance of the rectangular conductors in the frequency band of interest depends on the distance between the rectangular conductors and the ground conductor, and the imaginary part of the input admittance of the rectangular conductors depends on the electrical length of the long sides of the rectangular conductors. Therefore, matching conditions with a feed system can be made by adjusting the distance between the rectangular conductors and the ground conductor and the electrical length of the long sides of the rectangular conductors. By adjusting matching conditions in this manner, a desired value of coupling strength can be obtained in the center of a coupling range.

Also, as described above, coupling strength can be adjusted by properly adjusting the angle formed by the long sides of the rectangular conductors to adjust the direction of radiated electrical field components. As a result, a desired value of coupling strength can be obtained in the center of a coupling range.

On the other hand, when the coupling strength does not satisfy the desired value throughout the coupling range, the configuration of the electromagnetic coupler is changed (S7). For example, when the coupling strength is weak in a specific range of the coupling range, the electric length from the feeding point of the radiation conductor to either end of the radiation conductor may be changed to be an integral multiple of approximately $\lambda/4$ so that an electric field is generated in the specific range.

Herein, when the radiation conductor is open-ended, the rectangular conductors may be disposed such that the electrical length from the feeding point to either end of the radiation conductor is an odd multiple of approximately ¼ of the wavelength $\lambda$ of the central frequency of the frequency band of interest. Also, when both ends of the radiation conductor are short-circuited, the rectangular conductors may be disposed such that the electrical length from the feeding point to either end of the radiation conductor is an even multiple of approximately ¼ of the wavelength $\lambda$ of the central frequency of the frequency band of interest.

By selecting the electrical length of the radiation conductor in this manner, the input impedance of the rectangular conductors has a resonant frequency in the frequency band of interest, and the imaginary part of the input impedance becomes zero. As a result, matching adjustments with a common feed system whose input impedance has a zero imaginary part can be made easily, thereby making it easy to adjust coupling strength. After these changes to the configuration of the electromagnetic coupler are made, the design process goes back to S2 of the flowchart shown in FIG. 5 and coupling strength in the center of a coupling range is assessed.

As just described, according to the present invention, an electromagnetic coupler with a desired coupling strength and a coupling range is easily designed. Also, design time can be reduced by assessing whether coupling strength satisfies a desired value in two steps: one of assessing coupling strength in the center of a coupling range, and the other of assessing coupling strength throughout the coupling range.

Next, preferred embodiments of the present invention will be described below with reference to the accompanying drawings. The invention is not limited to the specific embodiments described below, but various modifications and combinations are possible without departing from the spirit and scope of the invention.

[First Embodiment of the Invention]

Figure 6:
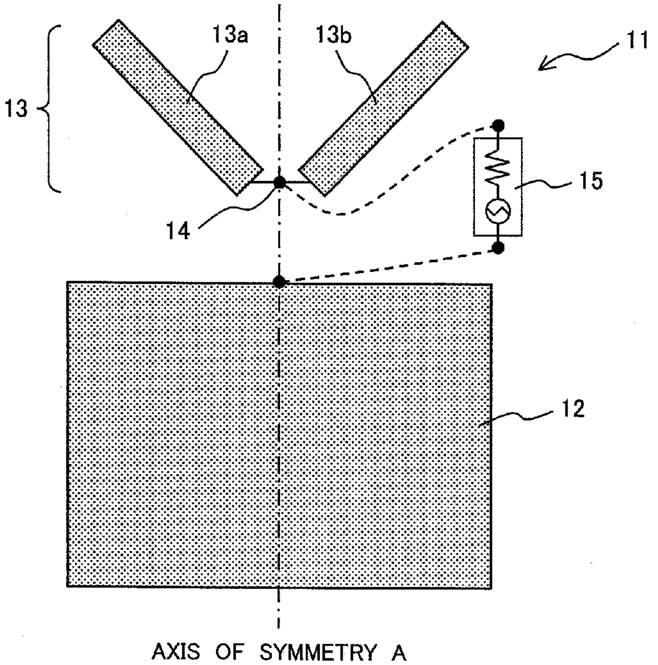
FIG. 6 is a schematic illustration showing a plan view of an exemplary electromagnetic coupler in accordance with a first embodiment of the invention.

A first embodiment of the present invention will be described hereinafter with reference to FIG. 6. FIG. 6 is a schematic illustration showing a plan view of an exemplary electromagnetic coupler in accordance with a first embodiment of the invention.

As shown in FIG. 6, an electromagnetic coupler 11 of the first embodiment has a ground conductor 12, a radiation conductor 13 composed of two rectangular conductors 13*a* and 13*b* connected in series, and a feeding point 14 formed in the connection of the two rectangular conductors 13*a* and 13*b*. The two rectangular conductors 13*a* and 13*b* are connected such that the extensions of their long sides cross each other at an angle other than π rad (π/2 rad in FIG. 6). Also, a power supply 15 is connected between the ground conductor 12 and the feeding point 14.

The radiation conductor 13 is disposed such that the two rectangular conductors 13*a* and 13*b* are line-symmetric with respect to an axis of symmetry A. Each of the angles formed by the axis of symmetry A and lines parallel to the long sides of the rectangular conductors 13*a* and 13*b* is other than π/2 rad (π/4 rad in FIG. 6). However, this angle may not necessarily be π/4 rad and can be adjusted as appropriate according to the required coupling strength and coupling range. This adjustment can be made by calculation based on the above-described design method.

One of the two short sides of each of the two rectangular conductors 13*a* and 13*b* is connected to the feeding point 14 in parallel, and the other short side of each of the two rectangular conductors 13*a* and 13*b* is open without being connected to the ground conductor 12. In the case that both ends of the radiation conductor 13 are open, the length from the feeding point 14 to either end of the radiation conductor 13 is preferable to be an odd multiple of approximately λ/4 in electrical length with respect to the wavelength λ of the central frequency of the frequency band of interest of the electromagnetic coupler 11. In FIG. 6, conductors with a length of approximately λ/4 or its odd multiple in the longitudinal direction are used as the rectangular conductors 13*a* and 13*b*.

In the present embodiment, the axis of symmetry A is a line parallel to an imaginary line connecting the electromagnetic coupler 11 and another electromagnetic coupler to be coupled with the electromagnetic coupler 11. Also, the axis of symmetry A extends perpendicularly from the side of the ground conductor 12 that faces the radiation conductor 13.

The ground conductor 12 and the radiation conductor 13 are formed on the same plane. As a result, the electromagnetic coupler 11 can be provided at low cost of a general-purpose single-layer glass epoxy printed-circuit board, for example. The electromagnetic coupler 11 can also be formed of metal plates such as copper plates and iron plates by stamping. In this case, each of the stamped metal plates may be laminated, with an insulation film for example, after being connected to a feeder such as a coaxial cable.

In the case of forming a conventional electromagnetic coupler of a general-purpose printed-circuit board, the design parameters are the size of its electrode and the width, length, and configuration of the transmission lines forming its series and parallel inductors. In contrast, because the electromagnetic coupler of the present invention does not require any electrodes, the design parameters include only the width, length, and configuration of the rectangular conductors, as described above. In other words, in the electromagnetic coupler of the invention, the design of an electrode is not required, and therefore the number of design parameters is less as compared to a conventional electromagnetic coupler. This means that the electromagnetic coupler of the invention can be designed more easily and at lower cost. In addition, the coupling strength and coupling range of the electromagnetic coupler of the invention can be adjusted without any constraints on the structure of an electrode.

Also, the coupling range of the electromagnetic coupler of the invention can be adjusted by changing the combination of rectangular conductors and their electrical length. As a result, it is possible to obtain an electromagnetic coupler with a relatively wide coupling range. Therefore, according to the present invention, there is a lot of flexibility in designing wireless terminals and devices including an electromagnetic coupler.

[Second Embodiment of the Invention]

Figure 10:
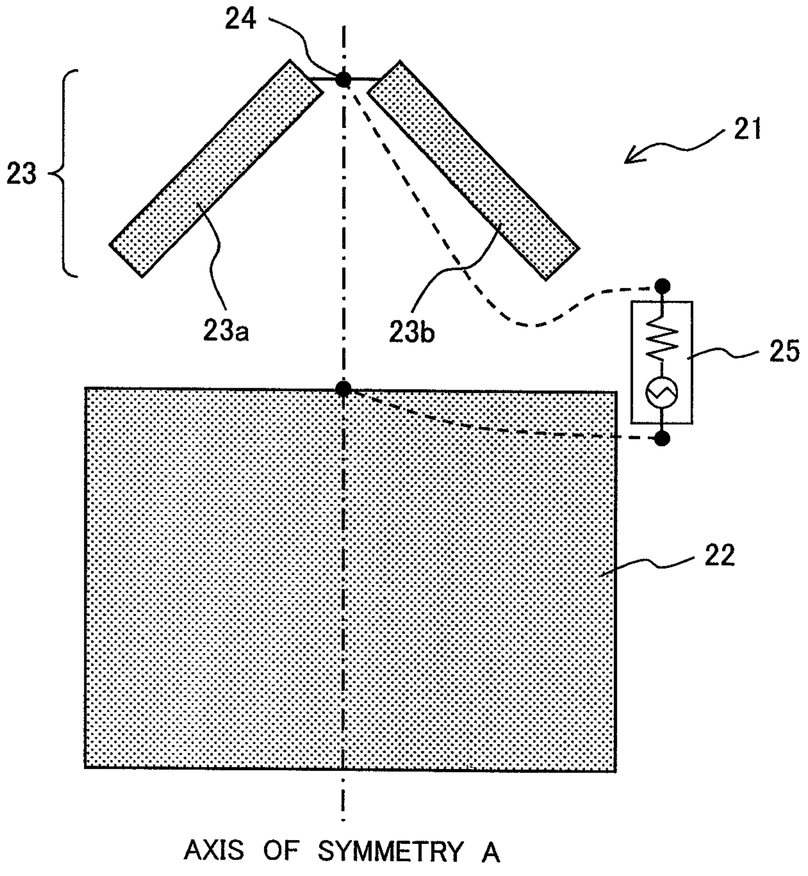
FIG. 10 is a schematic illustration showing a plan view of an exemplary electromagnetic coupler in accordance with a second embodiment of the invention.

A second embodiment of the present invention will be described hereinafter with reference to FIG. 10. FIG. 10 is a schematic illustration showing a plan view of an exemplary electromagnetic coupler in accordance with a second embodiment of the invention.

As shown in FIG. 10, an electromagnetic coupler 21 of the second embodiment has a ground conductor 22, a radiation conductor 23 composed of two rectangular conductors 23*a* and 23*b* connected in series, and a feeding point 24 formed in the connection of the two rectangular conductors 23*a* and 23*b*. Also, a power supply 25 is connected between the ground conductor 22 and the feeding point 24. Both ends of the radiation conductor 23 are open, and the length from the feeding point 24 to either end of the radiation conductor 23 is an odd multiple of approximately λ/4 in electrical length with respect to the wavelength λ of the central frequency of the frequency band of interest of the electromagnetic coupler 21. Therefore, in FIG. 10, conductors with a length of approximately λ/4 or its odd multiple in the longitudinal direction are used as the rectangular conductors 23*a* and 23*b*.

Here, the electromagnetic coupler 21 of the second embodiment is different from the electromagnetic coupler 11 of the first embodiment in the configuration of the two rectangular conductors 23*a* and 23*b*. As is the case with the first embodiment, the two rectangular conductors 23*a* and 23b are connected such that extensions of their long sides cross each other at an angle other than π rad (π/2 rad in FIG. 10) and disposed such that they are line-symmetric with respect to an axis of symmetry A; however, the directions of lines parallel to the long sides of the rectangular conductors 23*a* and 23*b* with respect to the axis of symmetry A are different from those in the first embodiment. Nevertheless, the electromagnetic coupler 21 of the present embodiment produces an operation and effect similar to those produced by the electromagnetic coupler 11 of the first embodiment.

[Third Embodiment of the Invention]

Figure 11:
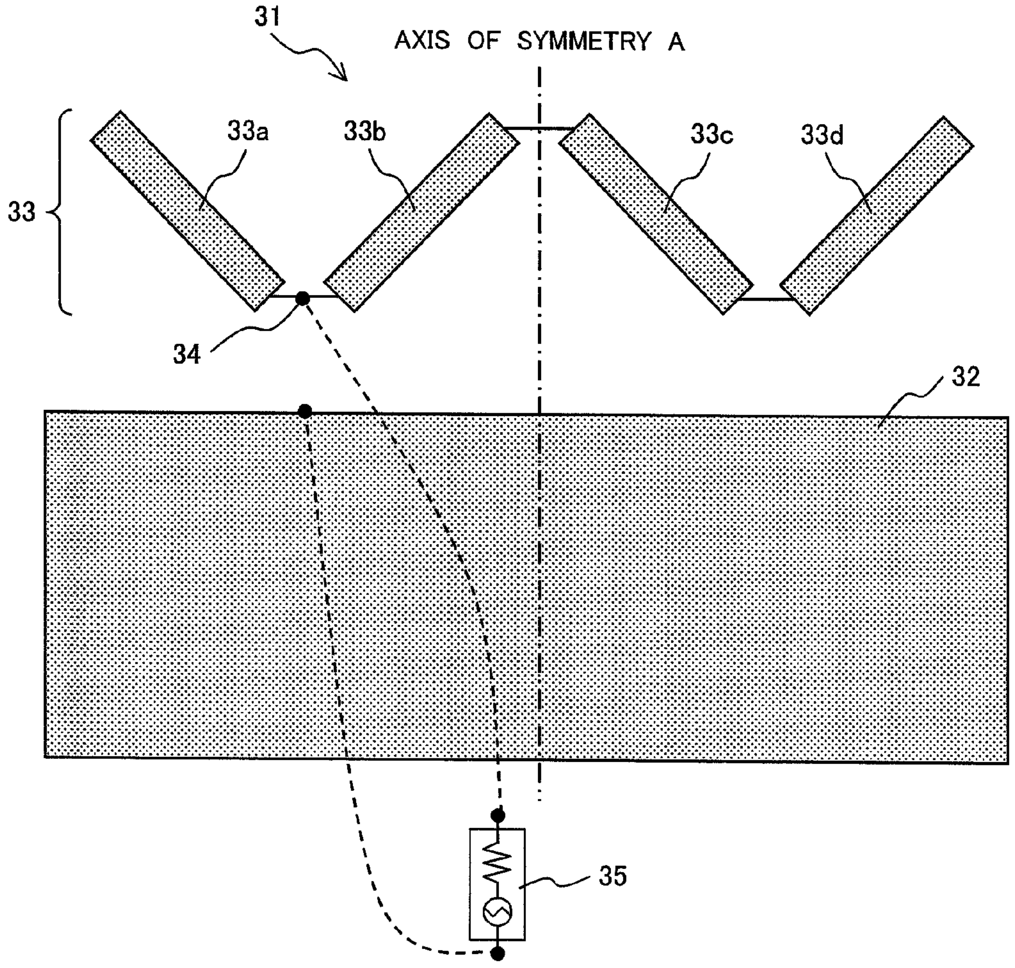
FIG. 11 is a schematic illustration showing a plan view of an exemplary electromagnetic coupler in accordance with a third embodiment of the invention.

A third embodiment of the present invention will be described hereinafter with reference to FIG. 11. FIG. 11 is a schematic illustration showing a plan view of an exemplary electromagnetic coupler in accordance with a third embodiment of the invention.

As shown in FIG. 11, an electromagnetic coupler 31 of the third embodiment has a ground conductor 32, a radiation conductor 33 composed of four rectangular conductors 33*a* to 33*d* connected in series, and a feeding point 34 formed at one point in the connection of the four rectangular conductors 33*a* to 33*d*. The four rectangular conductors 33*a* to 33*d* are connected in zigzag such that adjacent extensions of their long sides cross each other at an angle other than π rad (π/2 rad in FIG. 11). The feeding point 34 is connected in the connection of the rectangular conductors 33*a* and 33*b*. Also, a power supply 35 is connected between the ground conductor 32 and the feeding point 34.

The radiation conductor 33 is disposed such that the rectangular conductors 33*a* to 33*d* are line-symmetric with respect to an axis of symmetry A. Also, each of the angles formed by the axis of symmetry A and lines parallel to the long sides of the rectangular conductors 33*a* to 33*d* is other than π/2 rad (π/4 rad in FIG. 11). Each of the conductors used as the rectangular conductors 33*a* to 33*d* has an electrical length of approximately λ/4 in the longitudinal direction with respect to the wavelength λ of the central frequency of the frequency band of interest of the electromagnetic coupler 31. Therefore, the distance from the feeding point 34 to one end of the radiation conductor 33 and the distance from the feeding point 34 to the other end of the radiation conductor 33 are approximately λ/4 and approximately 3λ/4, respectively. The radiation conductor 33 is open-ended, and the distance from the feeding point 34 to either end of the radiation conductor 33 satisfies the condition that it is an odd multiple of approximately λ/4 in electrical length with respect to the wavelength λ.

As compared to the electromagnetic coupler 11 of the first embodiment, the electromagnetic coupler 31 of the present embodiment has a wider coupling range, because the line distance from the feeding point 34 to one end of the radiation conductor 33 is longer. Also, the electromagnetic coupler 31 can produce an operation and effect similar to those produced by the electromagnetic coupler 11 of the first embodiment.

[Fourth Embodiment of the Invention]

Figure 12:
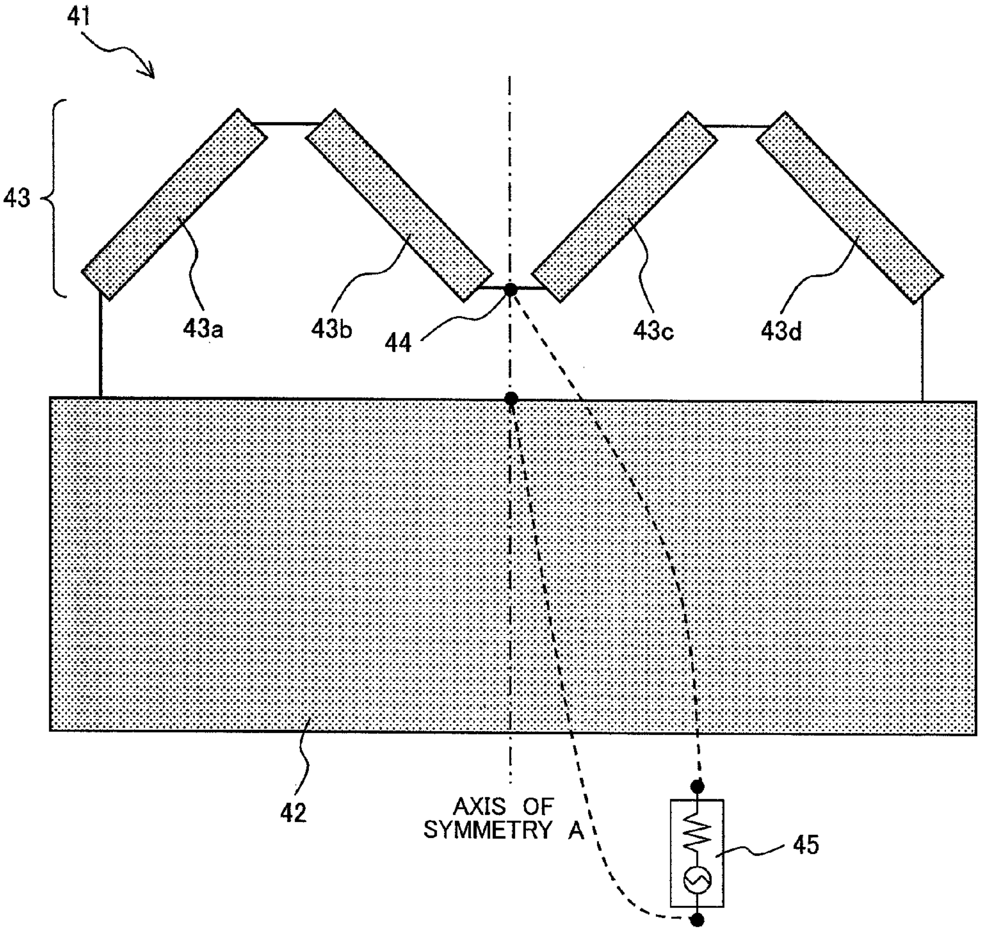
FIG. 12 is a schematic illustration showing a plan view of an exemplary electromagnetic coupler in accordance with a fourth embodiment of the invention.

A fourth embodiment of the present invention will be described hereinafter with reference to FIG. 12. FIG. 12 is a schematic illustration showing a plan view of an exemplary electromagnetic coupler in accordance with a fourth embodiment of the invention.

As shown in FIG. 12, an electromagnetic coupler 41 of the fourth embodiment has a ground conductor 42, a radiation conductor 43 composed of four rectangular conductors 43*a* to 43*d* connected in series, and a feeding point 44 formed at one point in the connection of the four rectangular conductors 43*a* to 43*d*. Either end of the radiation conductor 43 is short-circuited to the ground conductor 42. The four rectangular conductors 43*a* to 43*d* are connected in zigzag such that adjacent extensions of their long sides cross each other at an angle of other than π rad (π/2 rad in FIG. 12). The feeding point 44 is connected in the connection of the rectangular conductors 43*b* and 43*c*. Also, a power supply 45 is connected between the ground conductor 42 and the feeding point 44.

The radiation conductor 43 is disposed such that the rectangular conductors 43*a* to 43*d* are line-symmetric with respect to an axis of symmetry A. Also, each of the angles formed by the axis of symmetry A and lines parallel to the long sides of the rectangular conductors 43*a* to 43*d* is other than π/2 rad (π/4 rad in FIG. 12). Each of the conductors used as the rectangular conductors 43*a* to 43*d* has an electrical length of approximately λ/4 in the longitudinal direction with respect to the wavelength λ of the central frequency of the frequency band of interest of the electromagnetic coupler 41. Therefore, the distance from the feeding point 44 to either end of the radiation conductor 43 is approximately λ/2. Either end of the radiation conductor 43 is short-circuited to the ground conductor 42, and the distance from the feeding point 44 to either end of the radiation conductor 43 satisfies the condition that it is an even multiple of approximately λ/4 in electrical length with respect to the wavelength λ.

As compared to the electromagnetic coupler 11 of the first embodiment, the electromagnetic coupler 41 of the present embodiment has a wider coupling range, because the line distance from the feeding point 44 to either end of the radiation conductor 43 is longer. Also, the electromagnetic coupler 41 can produce an operation and effect similar to those produced by the electromagnetic coupler 11 of the first embodiment.

[Fifth Embodiment of the Invention]

Figure 13:
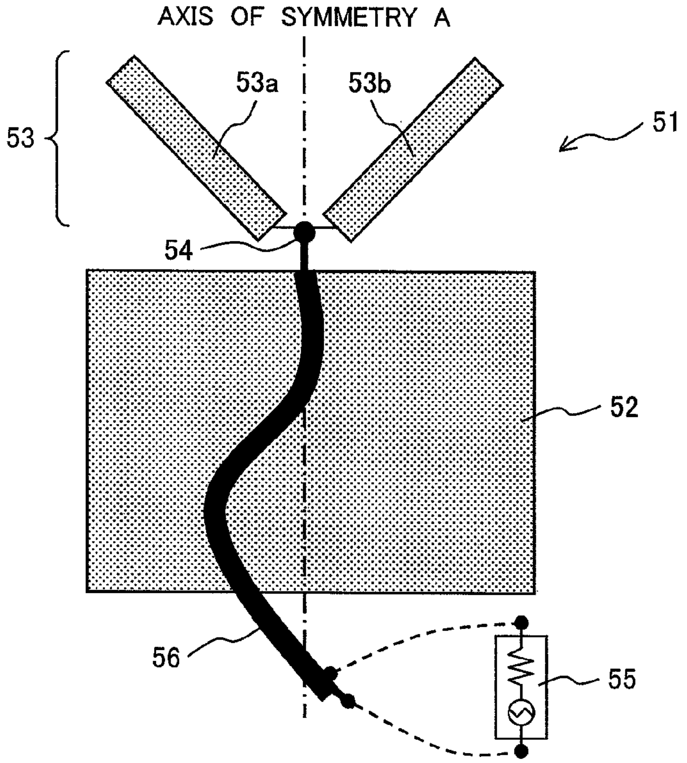
FIG. 13 is a schematic illustration showing a plan view of an exemplary electromagnetic coupler in accordance with a fifth embodiment of the invention.

A fifth embodiment of the present invention will be described hereinafter with reference to FIG. 13. FIG. 13 is a schematic illustration showing a plan view of an exemplary electromagnetic coupler in accordance with a fifth embodiment of the invention.

As shown in FIG. 13, the electromagnetic coupler 51 of the fifth embodiment has a ground conductor 52, a radiation conductor 53 composed of two rectangular conductors 53*a* and 53*b* connected in series, and a feeding point 54 formed in the connection of the two rectangular conductors 53*a* and 53*b*. The configuration of these is the same as that of the electromagnetic coupler 11 of the first embodiment. However, in the electromagnetic coupler 51 of the present embodiment, power is fed through a coaxial cable 56 from a power supply 55 connected between the ground conductor 52 and the feeding point 54. More specifically, a center conductor of the coaxial cable 56 is connected to the feeding point 54 and an outer conductor of the coaxial cable 56 is connected to the ground conductor 52.

The use of the coaxial cable 56 allows greater flexibility in the placement of the electromagnetic coupler 51. As a result, the electromagnetic coupler 51 can be placed at a location where it has an ideal coupling strength and coupling range, which makes it possible to improve the characteristics of the electromagnetic coupler 51. Any of the electromagnetic couplers of the second to fourth embodiments can be fed with power through a coaxial cable.

[Sixth Embodiment of the Invention]

Figure 14:
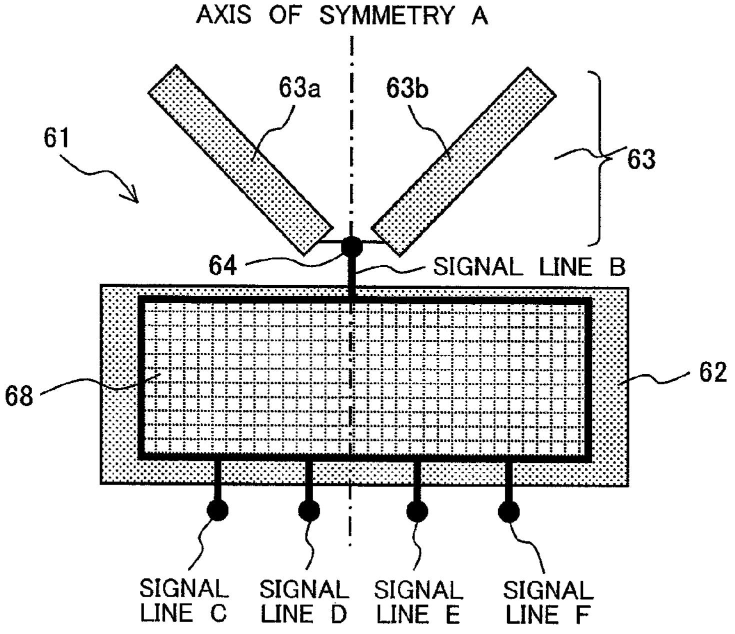
FIG. 14 is a schematic illustration showing a plan view of an exemplary electromagnetic coupler in accordance with a sixth embodiment of the invention.

A sixth embodiment of the present invention will be described hereinafter with reference to FIG. 14. FIG. 14 is a schematic illustration showing a plan view of an exemplary electromagnetic coupler in accordance with a sixth embodiment of the invention.

As shown in FIG. 14, the electromagnetic coupler 61 of the sixth embodiment has a ground conductor 62, a radiation conductor 63 composed of two rectangular conductors 63*a* and 63*b* connected in series, and a feeding point 64 formed in the connection of the two rectangular conductors 63*a* and 63*b*. The configuration of these is the same as that of the electromagnetic coupler 11 of the first embodiment. However, in the electromagnetic coupler 61 of the present embodiment, a communication transmitter and receiver module 68 for modulating and demodulating signals is disposed on the ground conductor 62.

The transmitter and receiver module 68 has a plurality of signal lines, one of which (the signal line B) is connected to the feeding point 64 of the radiation conductor 63. Each of the signal lines C to F in FIG. 14 is connected to the outside. In the present embodiment, for example, the signal line C feeds DC current to the transmitter and receiver module 68; the signal line D inputs control signals to the transmitter and receiver module 68 from the outside; the signal line E inputs signals to be wirelessly communicated using the electromagnetic coupler 61 to the transmitter and receiver module 68; and the signal line F transmits signals inputted to the transmitter and receiver module 68 from the electromagnetic coupler 61 to the outside.

The transmitter and receiver module 68 is fed a DC current from the outside via the signal line C and receives control signals for controlling the operation of the transmitter and receiver module 68 from the outside via the signal line D. When transmission is made by a wireless terminal including the electromagnetic coupler 61 having the transmitter and receiver module 68 thereon, signals to be wirelessly communicated are transmitted via the signal line E to the transmitter and receiver module 68, where the signals are modulated into signals suitable for wireless communications and then radiated from the electromagnetic coupler 61. When reception is made by this wireless terminal, signals received from the electromagnetic coupler 61 are transmitted to the transmitter and receiver module 68, where the signals are demodulated and then transmitted to the outside via the signal line F.

A ground conductor of the transmitter and receiver module 68 is disposed on the ground conductor 62 of the electromagnetic coupler 61. By integrating the electromagnetic coupler 61 with the transmitter and receiver module 68 as described above, the size of a wireless terminal including an electromagnetic coupler and a transmitter and receiver module can be reduced. The transmitter and receiver module 68 can be disposed on the ground conductor of any of the electromagnetic couplers of the second to fifth embodiments.

EXAMPLES

Hereafter, the present invention will be described in more detail based on the examples, however, the present invention is not intended to be limited to those examples.

Figure 7:
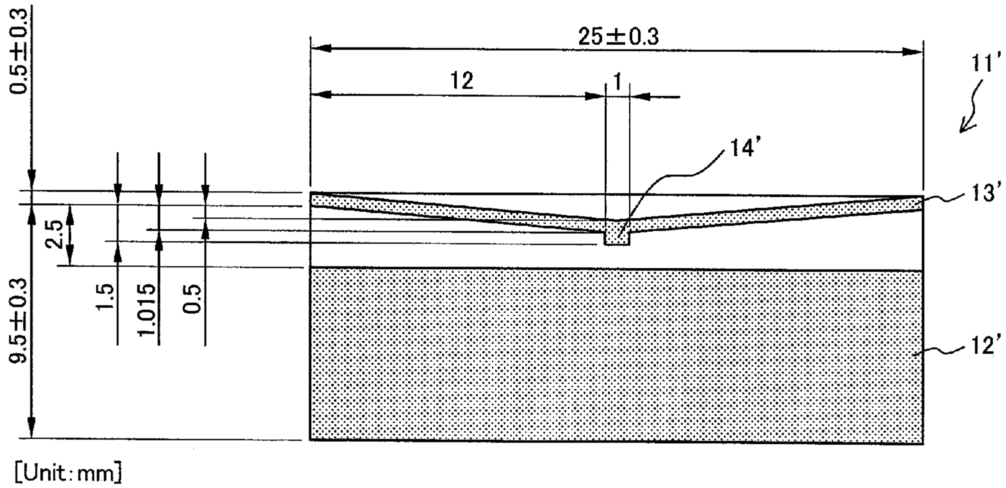
FIG. 7 is an illustration showing a plan view of a working example (prototype) of the electromagnetic coupler in accordance with the first embodiment.

FIG. 7 is an illustration showing a plan view of a working example (prototype) of the electromagnetic coupler in accordance with the first embodiment. As illustrated in FIG. 7, a prototype of the electromagnetic coupler 11' of the first embodiment has a ground conductor 12', a radiation conductor 13' composed of two rectangular conductors connected in series, and a feeding point 14' formed in the connection of the two rectangular conductors. Two of these electromagnetic couplers 11' were made. These two electromagnetic couplers 11' were disposed such that they faced each other, and the coupling strength and coupling range were measured.

The dimensions (unit: mm) of the prototype of the electromagnetic coupler 11' are shown in FIG. 7. For the prototype, a one-side copper-clad glass epoxy printed-circuit board with a thickness of 0.3 mm was used, and the wavelength shortening ratio when the glass epoxy printed-circuit board was used was approximately 0.7. Also, the central frequency of the frequency band of interest was set at 4.5 GHz. The wavelength corresponding to the central frequency of 4.5 GHz is approximately 67 mm. As shown in FIG. 7, the length of the long sides of the rectangular conductors was approximately 12 mm, which is roughly the same as ¼ of the wavelength corresponding to the central frequency of 4.5 GHz in electrical length (wavelength×shortening ratio×¼).

Figure 8:
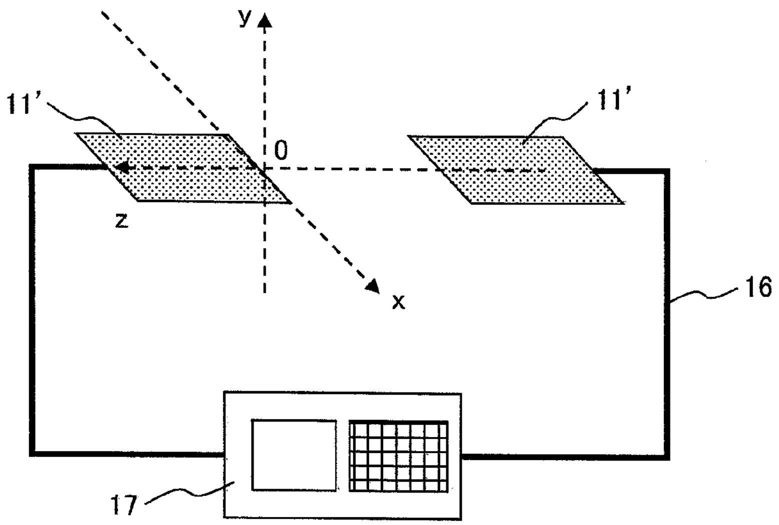
FIG. 8 is a schematic illustration showing a method for measuring coupling strength and coupling range of the prototype shown in FIG. 7.

FIG. 8 is a schematic illustration showing a method for measuring coupling strength and coupling range of the prototype shown in FIG. 7. As shown in FIG. 8, the two electromagnetic couplers 11', each of which was connected to a coaxial cable 16, were disposed such that the radiation conductors 13' face each other. The center conductor of the coaxial cable 16 was connected to the feeding point 14' of the radiation conductor 13'. Also, the outer conductor of the coaxial cable 16 was connected to the ground conductor 12' of each of the electromagnetic couplers 11'. The coaxial cable 16 connected to each of the electromagnetic couplers 11' was connected to a network analyzer 17 to measure the coupling strength. The measurement frequency was 4.5 GHz.

Here, mutually orthogonal X-, Y-, and Z-axes were determined with the tip of one of the electromagnetic couplers 11' as the origin point, as shown in FIG. 8, and the relative position of the two electromagnetic couplers 11' was used as a parameter. Since each electromagnetic coupler 11' has a rectangular shape, the relative position is about the two central points of the sides facing each other of the rectangular electromagnetic couplers 11'.

Figure 9:
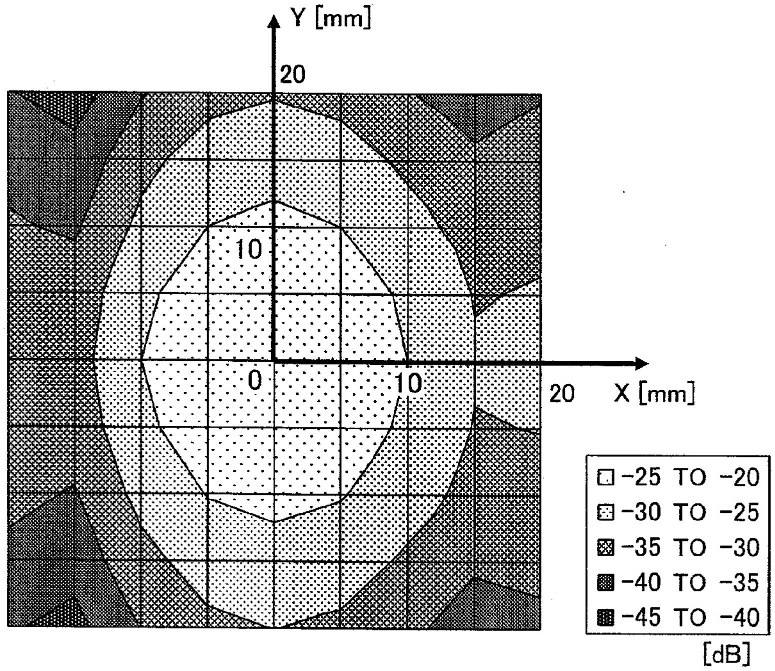
FIG. 9 shows a measurement result when a relative position of the two prototype electromagnetic couplers was −10 mm along Z-axis.

FIG. 9 shows a measurement result when a relative position of the two prototype electromagnetic couplers was −10 mm along Z-axis. FIG. 9 indicates that in the prototype electromagnetic coupler 11', a coupling strength equal to or greater than −30 dB was obtained when $-10\text{ mm}<X<10\text{ mm}$, and $-12\text{ mm}<Y<12\text{ mm}$ were satisfied, showing that sufficient coupling strength and coupling range have been achieved.

It should be evident that various changes and modifications may be made to the embodiments of the present invention described above with reference to the drawings by those skilled in the art without departing from the technical concept and scope of the present invention. For example, slight changes in shape of the rectangular conductors constituting the radiation conductor, such as curves and chamfers, may be made as long as they perform comparable functions. Also, slight variations in the length from the feeding point to either end of the radiation conductor, which is an integral multiple of $\lambda/4$ in electrical length with respect to the wavelength $\lambda$, of the central frequency of the frequency band of interest in the present invention, are included in the technical concept of the present invention. The same can be said for the rectangular conductors.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An electromagnetic coupler that communicates signals by using at least one of a longitudinal electrostatic field and a longitudinal induced electric field, comprising:

a ground conductor;

a radiation conductor composed of a plurality of rectangular conductors connected in series and separate from the ground conductor; and a feeding point formed at one point in connection with the plurality of rectangular conductors, wherein:

the ground conductor and the plurality of rectangular conductors are provided on a same plane;

the plurality of rectangular conductors are connected such that each pair of adjacent rectangular conductors form an angle other than $\pi$ rad;

a length from the feeding point to either end of the radiation conductor is an integral multiple of $\lambda/4$ in electrical length with respect to a wavelength λ of a central frequency of a frequency band of interest of the electromagnetic coupler; and the radiation conductor is disposed such that the plurality of rectangular conductors are line-symmetric with respect to a line that forms an angle other than π/2 rad with a line parallel to a long side of each of the plurality of rectangular conductors.

2. The electromagnetic coupler according to claim 1, wherein each of the plurality of rectangular conductors has a long side of an integral multiple of λ/4 in electrical length.

3. The electromagnetic coupler according to claim 1, wherein each of the plurality of rectangular conductors has a short side smaller than 0.15 times the wavelength λ in electrical length.

4. The electromagnetic coupler according to claim 1, wherein the plurality of rectangular conductors and the ground conductor are formed on a dielectric substrate.

5. The electromagnetic coupler according to claim 1, wherein each of the plurality of rectangular conductors and the ground conductor is formed of a metal plate.

6. The electromagnetic coupler according to claim 1, wherein:

one end of the radiation conductor is open; and a length from the feeding point to the open end of the radiation conductor is an odd multiple of λ/4 in electrical length.

7. The electromagnetic coupler according to claim 1, wherein:

one end of the radiation conductor is short-circuited; and a length from the feeding point to the short-circuited end of the radiation conductor is an even multiple of λ/4 in electrical length.

8. A wireless terminal comprising:

an electromagnetic coupler that communicates signals by using at least one of a longitudinal electrostatic field and a longitudinal induced electric field, the electromagnetic coupler including:

a ground conductor;

a radiation conductor composed of a plurality of rectangular conductors connected in series and separate from the ground conductor; and a feeding point formed at one point in a connection of the plurality of rectangular conductors, and a communication transmitter and receiver module for modulating and demodulating signals, wherein:

the ground conductor and the plurality of rectangular conductors are provided on a same plane;

the plurality of rectangular conductors is connected such that each pair of adjacent rectangular conductors form an angle other than π rad;

a length from the feeding point to either end of the radiation conductor is an integral multiple of λ/4 in electrical length with respect to a wavelength λ of a central frequency of a frequency band of interest of the electromagnetic coupler;

the radiation conductor is disposed such that the plurality of rectangular conductors are line-symmetric with respect to a line that forms an angle other than π/2 rad with a line parallel to a long side of each of the plurality of rectangular conductors; and a signal line of the transmitter and receiver module is connected to the feeding point of the radiation conductor.

9. The wireless terminal according to claim 8, wherein the transmitter and receiver module is disposed on the ground conductor of the electromagnetic coupler.

10. A method for forming an electromagnetic coupler that communicates signals by using at least one of a longitudinal electrostatic field and a longitudinal induced electric field, comprising the steps of:

selecting an initial configuration composed of a ground conductor, a radiation conductor composed of a plurality of rectangular conductors connected in series and separate from the ground conductor, and a feeding point formed at one point in connection with the plurality of rectangular conductors;

arranging the ground conductor and the plurality of rectangular conductors on a same plane;

connecting the plurality of rectangular conductors so that each pair of adjacent rectangular conductors form an angle other than it π rad;

providing a length from the feeding point to either end of the radiation conductor as an integral multiple of λ/4 in electrical length with respect to a wavelength λ of a central frequency of a frequency band of interest of the electromagnetic coupler;

disposing the radiation conductor so that the plurality of rectangular conductors are line-symmetric with respect to a line that forms an angle other than it π/2 rad with a line parallel to a long side of each of the plurality of rectangular conductors so as to form the electromagnetic coupler;

assessing whether the selected initial configuration satisfies a desired value of coupling strength in a center of a coupling range or not; and assessing whether the configuration judged to satisfy the desired value of coupling strength in the center of the coupling range satisfies the desired value of coupling strength throughout the coupling range.

11. The method for forming an electromagnetic coupler according to claim 10, further comprising the step of:

adjusting at least one of a distance between the rectangular conductors and the ground conductor and an electrical length of a long side of the rectangular conductors when the selected configuration is judged not to satisfy the desired value of coupling strength in the center of the coupling range.

12. The method for forming an electromagnetic coupler according to claim 10, characterized in selecting an initial configuration including an open-ended radiation conductor composed of two rectangular conductors that are ¼ of a wavelength λ of a central frequency of a frequency band of interest of the electromagnetic coupler in electrical length.

* * * * *